(12) United States Patent
Freund, Jr. et al.

(10) Patent No.: US 7,624,616 B2
(45) Date of Patent: Dec. 1, 2009

(54) METER PROVING METHOD AND SYSTEM

(75) Inventors: William R. Freund, Jr., Houston, TX (US); Gail P. Murray, Tomball, TX (US); Kerry D. Groeschel, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 338 days.

(21) Appl. No.: 11/459,077

(22) Filed: Jul. 21, 2006

(65) Prior Publication Data

US 2007/0119500 A1 May 31, 2007

Related U.S. Application Data

(60) Provisional application No. 60/710,663, filed on Aug. 23, 2005.

(51) Int. Cl.
*G01F 25/00* (2006.01)
(52) U.S. Cl. ...................................................... 73/1.34
(58) Field of Classification Search ................... 73/1.01, 73/1.34, 1.16; 702/85, 100
See application file for complete search history.

(56) References Cited

U.S. PATENT DOCUMENTS 6,647,806 B1    11/2003    Estrada et al. ............ 73/861.28
6,792,361 B2    9/2004    Vun Cannon ................ 702/46
2008/0189054 A1*    8/2008    McAnally et al. ............ 702/45

FOREIGN PATENT DOCUMENTS

EP    0 657 021 B1    4/1997
EP    1 094 303 A1    4/2001

OTHER PUBLICATIONS

International Search Report for application No. PCT/US2006/029079 dated Jul. 10, 2007; 2pp.

* cited by examiner

*Primary Examiner*—Hezron Williams
*Assistant Examiner*—Tamiko D Bellamy
(74) *Attorney, Agent, or Firm*—Mark E. Scott; Conley Rose, P.C.

(57) ABSTRACT

A meter proving method and system. At lease some of the illustrative embodiments are methods comprising establishing a prover time by a prover device, measuring a flow rate of a fluid with a flow meter that uses multiple measurements taken over a period of time to produce each individual flow rate value (the flow meter electrically coupled to the prover device), and generating a meter volume over the prover time based on the flow rate. The generating the meter volume based on the flow rate does not involve: generating a pulse train output signal by the flow meter; and generating the meter volume based on an attribute of the pulse train.

12 Claims, 9 Drawing Sheets

METER PROVING METHOD AND SYSTEM

CROSS REFERENCE TO RELATED APPLICATIONS

This specification claims the benefit of provisional application Ser. No. 60/710,663, filed Aug. 23, 2005, titled "Meter Proving Method and System," which is incorporated herein by reference as if reproduced in full below.

BACKGROUND

After hydrocarbons have been removed from the ground, the fluid stream (such as crude oil or natural gas) is transported from place to place via pipelines. It is desirable to know with accuracy the amount of fluid flowing in the stream, and particular accuracy is demanded when the fluid is changing hands, or "custody transfer."

Meter proving methods "prove" the accuracy of flow meter measurements. FIG. 1 illustrates a system 10 for proving a turbine meter 12. A turbine meter, based on turning of a turbine-like structure within the fluid stream, generates electrical pulses (illustrated in FIG. 1) where each pulse is proportional to a flow volume, and the rate of pulses proportional to flow rate. A prover time is the time period defined by a prover element flowing first past an upstream detector 16 then a downstream detector 18 in prover 20 (the prover time also illustrated in FIG. 1). Signals from the upstream detector 16 and downstream detector 18 indicating prover time are collected at a processor 26. The processor 26 also collects pulses from signal line 14 and determines which pulses fall within the prover time. The number of pulses generated by the turbine meter 12 during the prover time is indicative of the volume measured by the meter during the prover time. By comparing the prover volume to the volume measured by the meter, the meter may be "proved."

FIG. 2 illustrates another system 50 for proving an ultrasonic flow meter 52. By ultrasonic it is meant that ultrasonic signals are sent back and forth across the fluid stream, and based on various characteristics of the ultrasonic signals a fluid flow may be calculated. Ultrasonic meters generate flow rate data in batches where each batch comprises many sets of ultrasonic signals sent back and forth across the fluid, and thus where each batch spans a period of time (e.g., one second). The flow rate determined by the meter corresponds to an average flow rate over the batch time period rather than a flow rate at a particular point in time.

The American Petroleum Institute (API) requires proving by comparing a prover volume to a meter volume, with the meter volume determined from pulses. Conforming to this standard dictates that data from an ultrasonic flow meter be converted to pulses for purposes of proving. Such a conversion may be carried out in an internal processor 54, with the pulses supplied to the external processor 26 to prove the ultrasonic meter 52 as described above. However, the pulses created by an ultrasonic meter may be based on an average flow rate over a batch time period with the pulses created after the end of a batch time period. Thus, even though a particular pulse may fall within the proving time, the fluid flow that formed the basis of the pulse may have occurred before the beginning of the prover time because of the batch operation of the meter. Likewise, a value of fluid flow through the meter during the proving time may be converted to pulses that fall outside the proving time because of the batch nature of the meter. These, and possibly other, difficulties in proving flow meters, such as ultrasonic flow meters, create shortcomings in related art meter proving methods.

SUMMARY

The problems noted above are solved in large part by a meter proving method and system. At lease some of the illustrative embodiments are methods comprising establishing a prover time by a prover device, measuring a flow rate of a fluid with a flow meter that uses multiple measurements taken over a period of time to produce each individual flow rate value (the flow meter electrically coupled to the prover device), and generating a meter volume over the prover time based on the flow rate. The generating the meter volume based on the flow rate does not involve generating a pulse train output signal by the flow meter and generating the meter volume based on an attribute of the pulse train.

Other illustrative embodiments are systems comprising a prover device (configured to establish a prover time) and a flow meter. The flow meter comprises a spoolpiece that fluidly couples within a fluid flow, a transducer pair mechanically coupled to the spoolpiece, and a processor electrically coupled to the transducer pair. The processor of the flow meter electrically couples to the prover device, and the processor of the flow meter calculates a volume of fluid that flows through the flow meter during the prover time.

Yet still other illustrative embodiments are an ultrasonic flow meter comprising a spoolpiece (configured to couple within a fluid pathway), a plurality of ultrasonic transducers mechanically coupled to the spoolpiece and arranged such that the ultrasonic transducers impart ultrasonic energy to a fluid with the spoolpiece. The processor electrically coupled to the plurality of ultrasonic transducers and configured to electrically couple to a prover and to receive signals form the prover indicative of a first period of time. The processor calculates a test volume being the volume of fluid flow through the flow meter corresponding to the first period of time.

BRIEF DESCRIPTION OF THE DRAWINGS

For a more detailed description of the various embodiments, reference will now be made to the accompanying drawings, wherein.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

In the following discussion and in the claims, the term "fluid" may refer to a liquid or gas and is not solely related to any particular type of fluid such as hydrocarbons.

DETAILED DESCRIPTION

Figure 1:
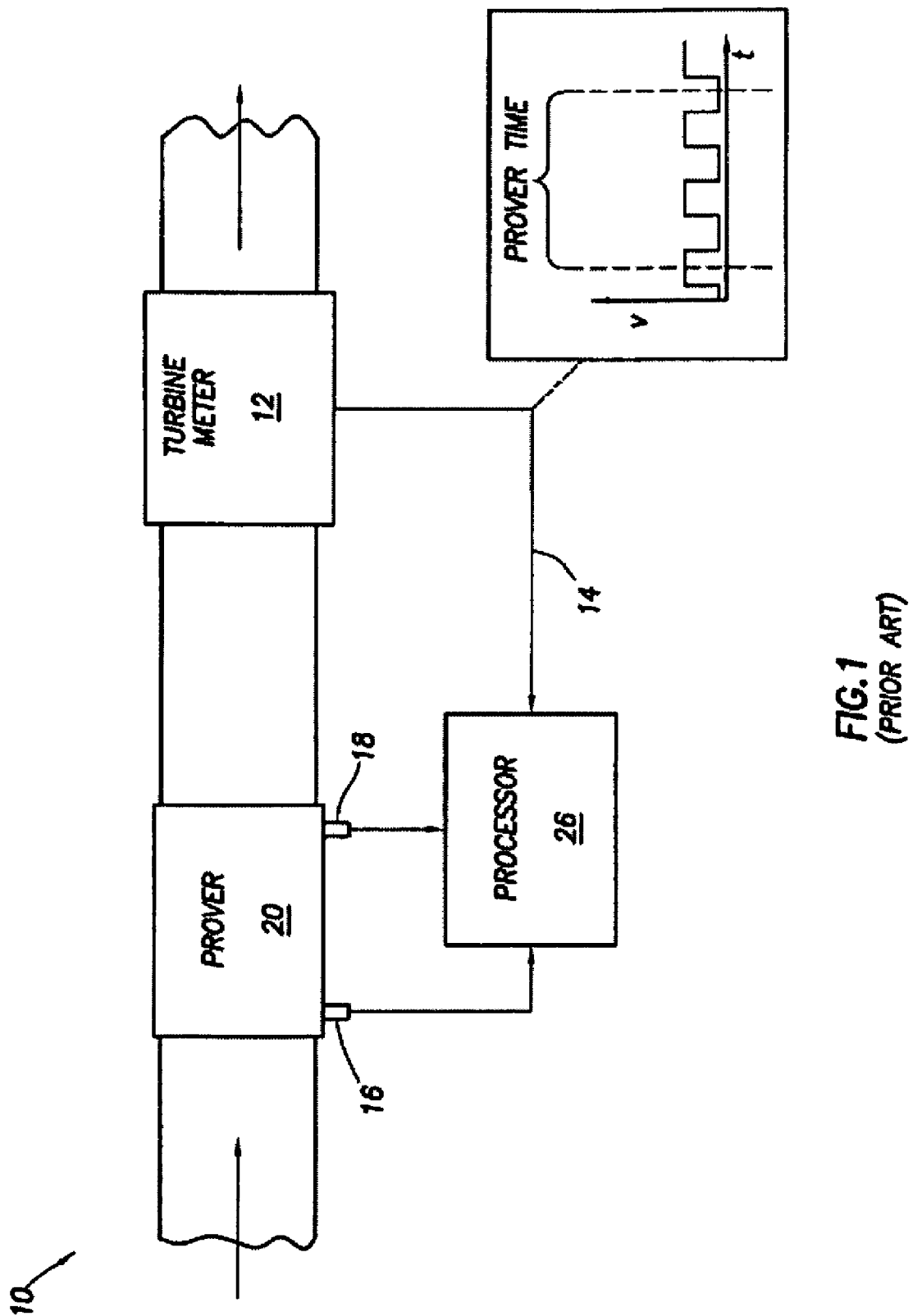
FIG. 1 illustrates a prover and turbine-type meter arrangement of the related art.
Figure 2:
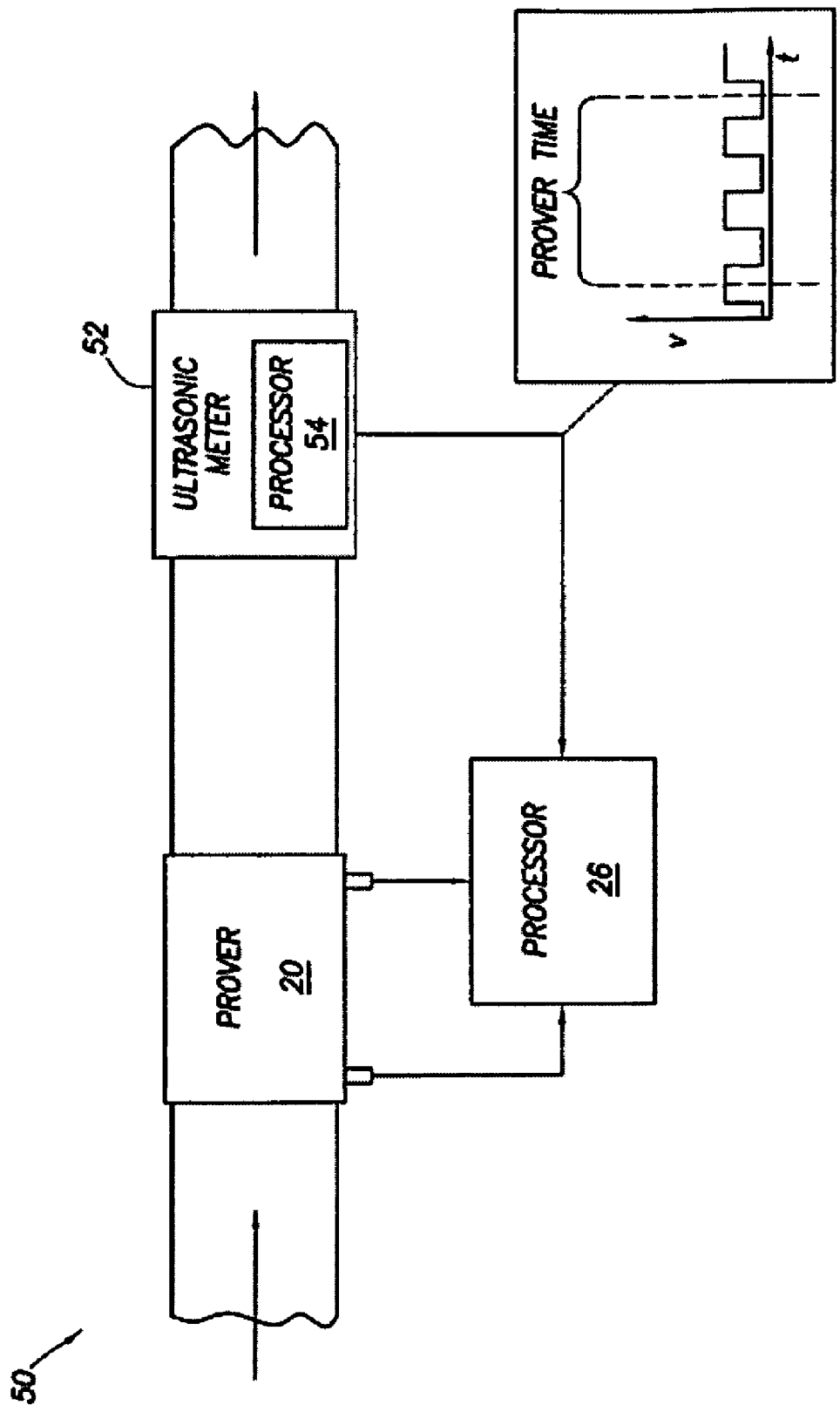
FIG. 2 illustrates a prover and an ultrasonic meter arrangement of the related art.
Figure 3A:
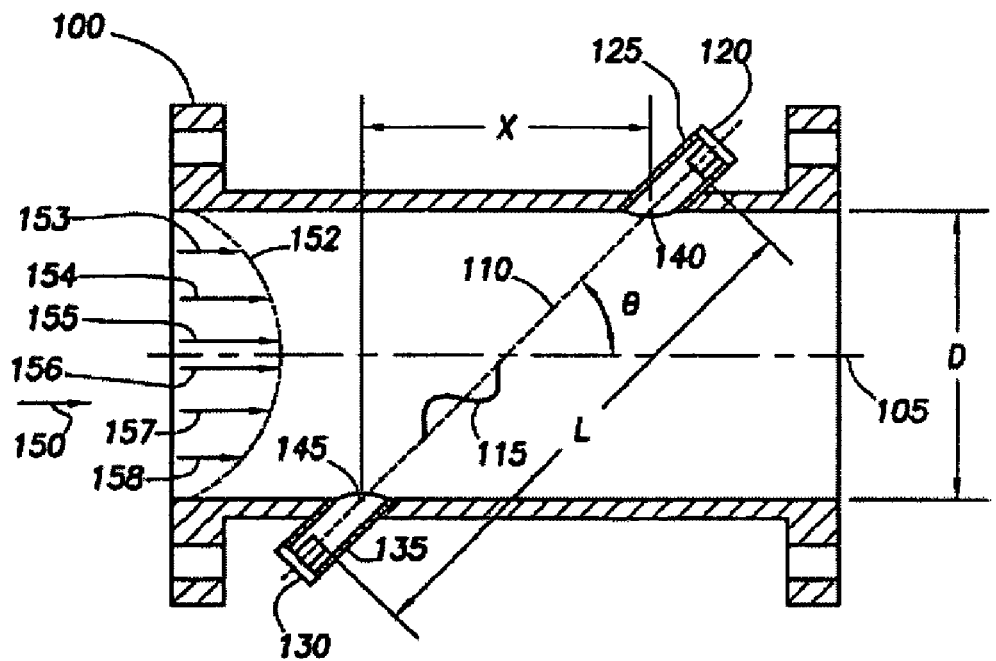
FIG. 3A is a cut-away top view of an ultrasonic flow meter.

FIG. 3A shows an ultrasonic meter suitable for measuring fluid flow in accordance with embodiments of the invention. Spoolpiece 100, suitable for placement between sections of a pipeline, has a predetermined size and thus defines a measurement section. As used herein, the term "pipeline" when used in reference to an ultrasonic meter may refer also to the spoolpiece or other appropriate housing across which ultrasonic signals are sent. A pair of transducers 120 and 130, and their respective housings 125 and 135, are located along the length of spoolpiece 100. Transducers 120 and 130 are preferably ultrasonic transceivers, meaning that they both generate and receive ultrasonic signals. "Ultrasonic" in this context refers to frequencies above about 20 kilohertz. These signals may be generated and received by a piezoelectric element in each transducer. To generate an ultrasonic signal, the piezoelectric element is stimulated electrically, and it responds by vibrating. The vibration of the piezoelectric element generates an ultrasonic signal that travels through the fluid across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter A path 110, sometimes referred to as a "chord," exists between transducers 120 and 130 at an angle θ to a centerline 105. The length of "chord" 110 is the distance between the face of transducer 120 to the face of transducer 130. Points 140 and 145 define the locations where acoustic signals generated by transducers 120 and 130 enter and leave the fluid flowing through the spoolpiece 100 (i.e. the entrance to the spoolpiece bore). The position of transducers 120 and 130 may be defined by the angle θ, by a first length L measured between transducers 120 and 130, a second length X corresponding to the axial distance between points 140 and 145, and a third length D corresponding to the pipe diameter. In most cases distances D, X and L are precisely determined during meter fabrication. Further, transducers such as 120 and 130 are usually placed a specific distance from points 140 and 145, respectively, regardless of meter size (i.e. spoolpiece size). A fluid flows in a direction 150 with a velocity profile 152. Velocity vectors 153-158 illustrate that the fluid velocity through spool piece 100 increases as centerline 105 of spoolpiece 100 is approached.

Initially, downstream transducer 120 generates an ultrasonic signal that is received at, and detected by, upstream transducer 130. Some time later, the upstream transducer 130 generates a return ultrasonic signal that is subsequently received at, and detected by, the downstream transducer 120. Thus, the transducers 120 and 130 play "pitch and catch" with ultrasonic signals 115 along chordal path 110. During operation, this sequence may occur thousands of times per minute.

The transit time of the ultrasonic wave 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than its transit time when traveling upstream (i.e. against the flow). The upstream and downstream transit times can be used to calculate the average velocity along the signal path, and may also be used to calculate the speed of sound in the fluid flow. Given the cross-sectional measurements of the meter carrying the fluid, the average velocity over the area of the meter bore may be used to find the volume of fluid flowing through the meter or pipeline 100.

Figure 3B:
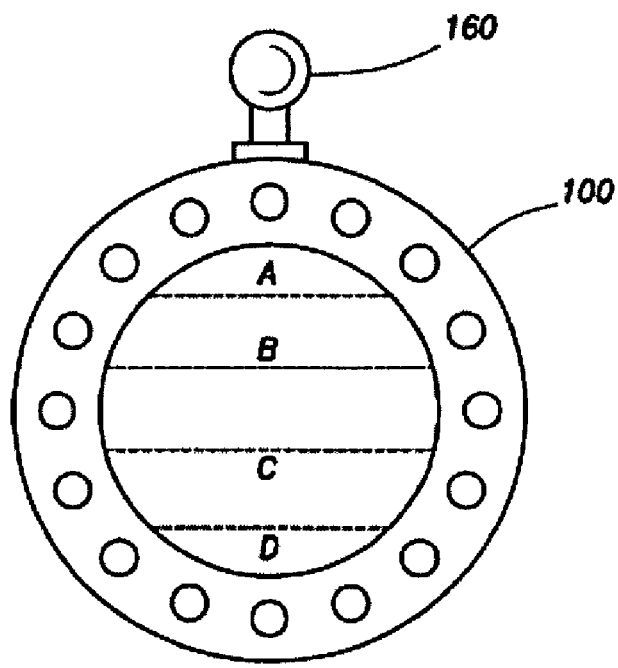
FIG. 3B is an end view of a spoolpiece including chordal paths A-D.

Ultrasonic flow meters can have one or more paths. FIG. 3B illustrates a multi-path ultrasonic meter. In these embodiments spoolpiece 100 comprises four chordal paths A, B, C, and D at varying levels through the fluid flow. Each chordal path A-D corresponds to two transducers behaving alternately as a transmitter and receiver. Also shown are control electronics 160, which acquires and processes the data from the four chordal paths A-D. Hidden from view in FIG. 4B are the four pairs of transducers that correspond to chordal paths A-D.

Figure 3C:
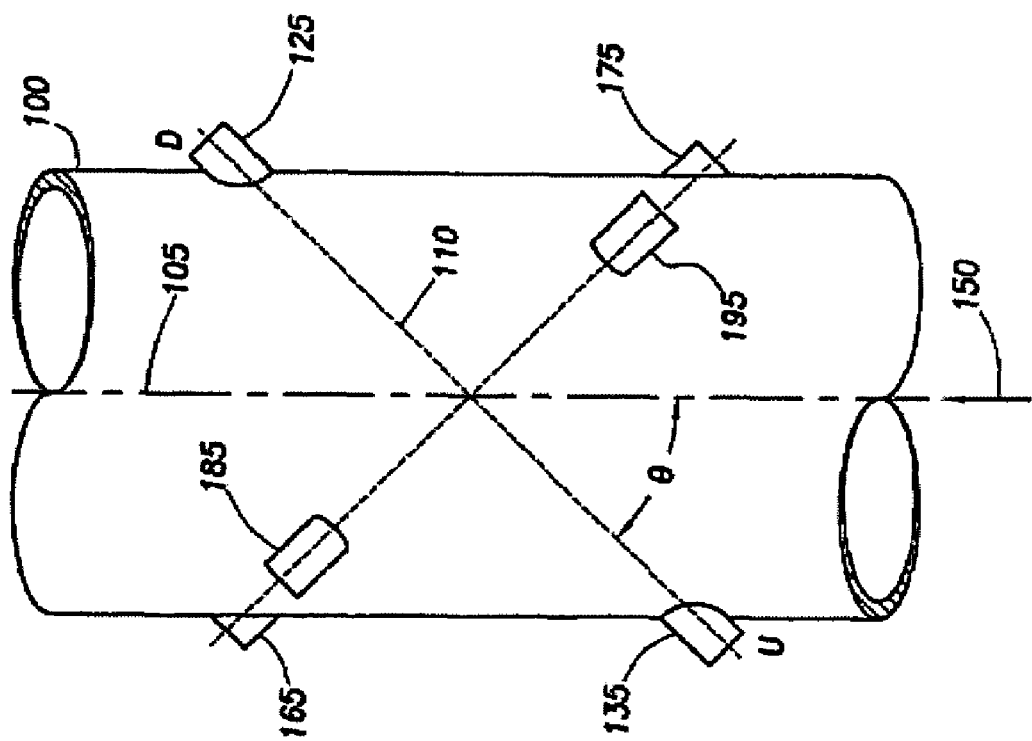
FIG. 3C is a top view of a spoolpiece housing transducer pairs.

The precise arrangement of the four pairs of transducers may be more easily understood by reference to FIG. 3C. Four pairs of transducer ports are mounted on spool piece 100. Each pair of transducer ports corresponds to a single chordal path of FIG. 3B. A first pair of transducer ports 125 and 135 includes transducers 120 and 130 (FIG. 3A) recessed slightly from the spool piece 100. The transducers are mounted at a non-perpendicular angle θ to centerline 105 of spool piece 100. Another pair of transducer ports comprising ports 165 and 175 (only partially in view) including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level". Not explicitly shown in FIG. 3C is a fourth pair of transducers and transducer ports. Taking FIGS. 3B and 3C together, the pairs of transducers are arranged such that the upper two pairs of transducers corresponding to chords A and B form an X, and the lower two pairs of transducers corresponding to chords C and D also form an X. The flow velocity of the fluid may be determined at each chord A-D to obtain chordal flow velocities, and the chordal flow velocities are combined to determine an average flow velocity over the entire pipe. From the average flow velocity, the amount of fluid flowing in the pipeline may be determined.

As can be appreciated from the discussion of FIGS. 3A, 3B and 3C, it takes a finite amount of time for an ultrasonic meter to calculate a flow rate because of the pitch and catch method (that is, a plurality of individual ultrasonic measurements) of operation. Moreover, some embodiments may determine flow rate (e.g., using the pitch and catch method) a plurality of times and calculate an average flow rate for a particular period, with the total flow during the period being the length of the period multiplied by the average flow rate for the period. Stated otherwise, some flow meters use multiple measurements taken over a period of time to produce a single (in some embodiments average) flow rate measurement, with the flow volume calculated as the product of the (volumetric) flow rate measurement and the batch time period.

Figure 4A:
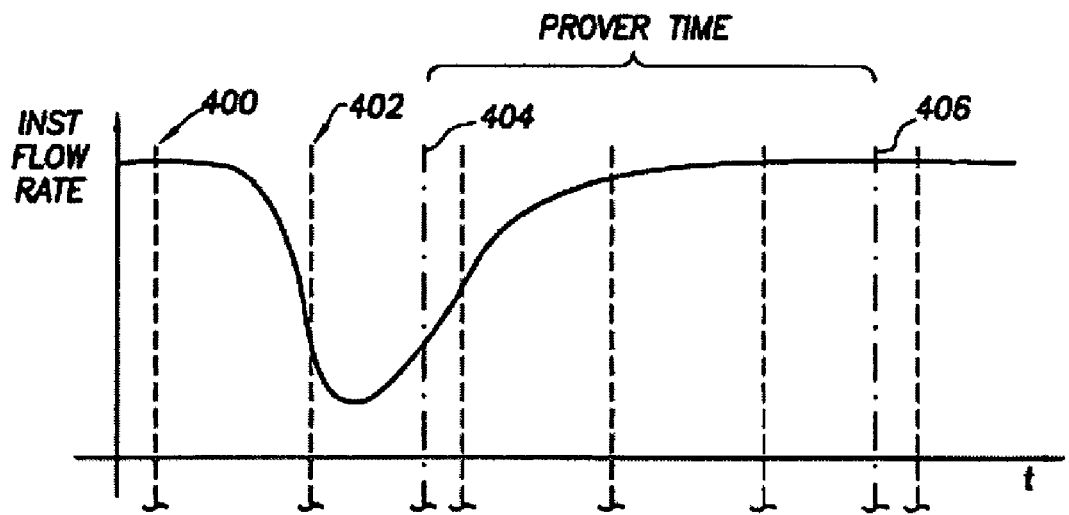
FIG. 4A illustrates a plot of instantaneous flow rate of fluid within a prover and an ultrasonic meter as a function of time.
Figure 4B:
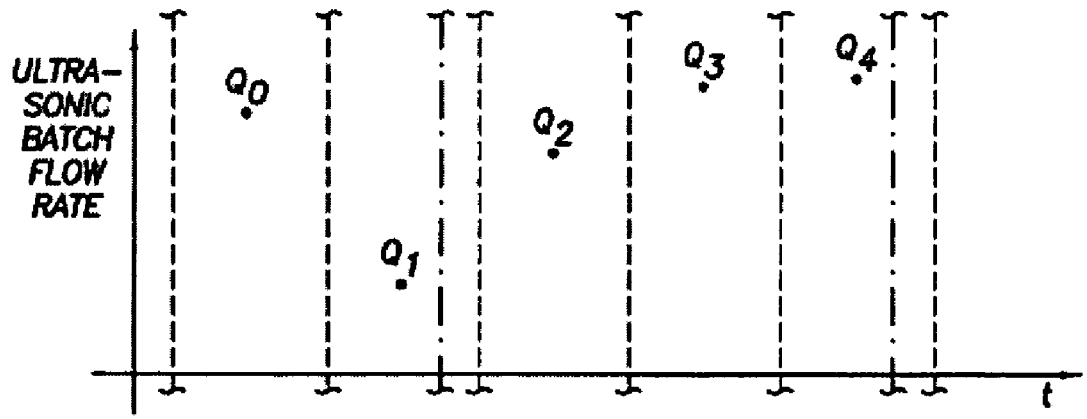
FIG. 4B illustrates an ultrasonic flow meter batch flow rate as a function of time.
Figure 4C:
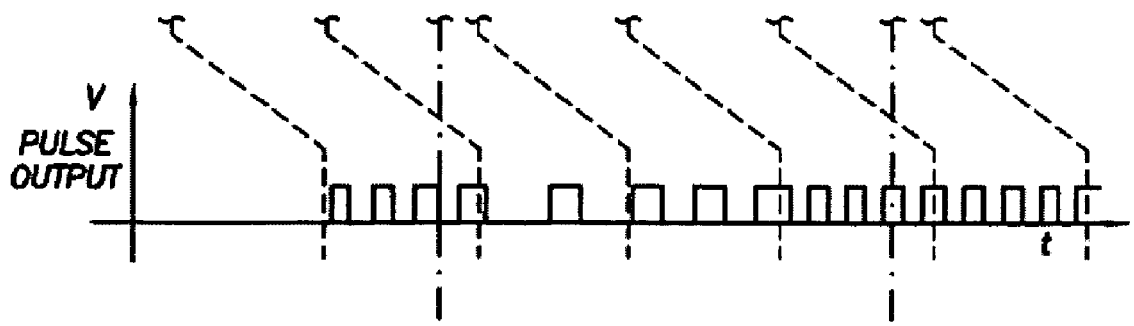
FIG. 4C illustrates a manufactured pulse output from an ultrasonic flow meter.

FIGS. 4A, 4B, and 4C illustrate shortcomings of the related art proving methods. In particular, FIG. 4A is a plot of the instantaneous flow rate within a prover and an ultrasonic meter as a function of time. The dip in flow rate illustrated by FIG. 4A may be, for example, the disruption in flow caused by launch of the element or prover ball. FIG. 4B illustrates the ultrasonic meter flow rates as a function of time. Finally, FIG. 4C illustrates a manufactured pulse output signal based on the ultrasonic flow meter flow rates. The dashed lines of FIG. 4B illustrate batch time periods for the ultrasonic flow meter with each average flow rate ($Q_x$) being the average flow rate for the time period between dashed lines. The dashed lines of FIG. 4B extend upward into FIG. 4A to illustrate the correspondence of the batch time periods to the instantaneous flow rate. Likewise, the dashed lines of FIG. 4B extend downward into FIG. 4C to illustrate the correspondence of the pulse outputs to the average flow rates. While the points indicative of average flow rate values (e.g., $Q_0$, $Q_1$, $Q_2$, $Q_3$ and $Q_4$) are shown in the middle of their respective batch time period, in actuality the average flow rates are calculated at the end of the batch time period. Taking for purposes of explanation the average flow rate $Q_0$, the $Q_0$ flow rate is the average flow rate between vertical line 400 and vertical line 402. While $Q_0$ is shown between line 400 and line 402, $Q_0$ is calculated just after the point in time illustration by line 402. Because the average flow rate is not calculated until after the end of the batch period, if the ultrasonic meter is to be proved using a pulse output signal, the manufactured pulse outputs are based on the average flow rate over the last batch time period, and therefore are not generated until after the end of the batch time period. As illustrated by FIG. 4C, the manufactured pulse output signal corresponding to the flow through the meter during a batch period is delayed, possibly up to an entire batch time period.

FIGS. 4A, 4B, and 4C, also illustrate a prover time by dash-dot-dash lines 404 and 406. As alluded to above, the prover time may be defined by the period of time the prover element takes to flow between an upstream detector and a downstream detector. If one is attempting to prove an ultrasonic flow meter, the related art method is to have the ultrasonic meter manufacture a pulse output signal, and the pulses between the start of the prover time (line 404) and the end of the prover time (line 406) are counted. However, as illustrated in FIGS. 4A, 4B and 4C, the pulses manufactured by the ultrasonic meter during the prover time do not correspond well to the actual flow through the meter during the prover time, which introduces error (in some cases significant error).

In order to address these and possibly other difficulties, in accordance with embodiments of the invention an ultrasonic meter measured volume is determined, where the determination does not involve manufacturing pulses and determining meter volume based on an attribute and/or number of pulses; rather, the one or more batch time periods of the ultrasonic flow meter during the prover time are more closely correlated to the prover time, and the flow rates for the ultrasonic meter are based in whole or in part on the individual ultrasonic measurements made during a batch time period or periods that correlate to the prover time.

Figure 5:
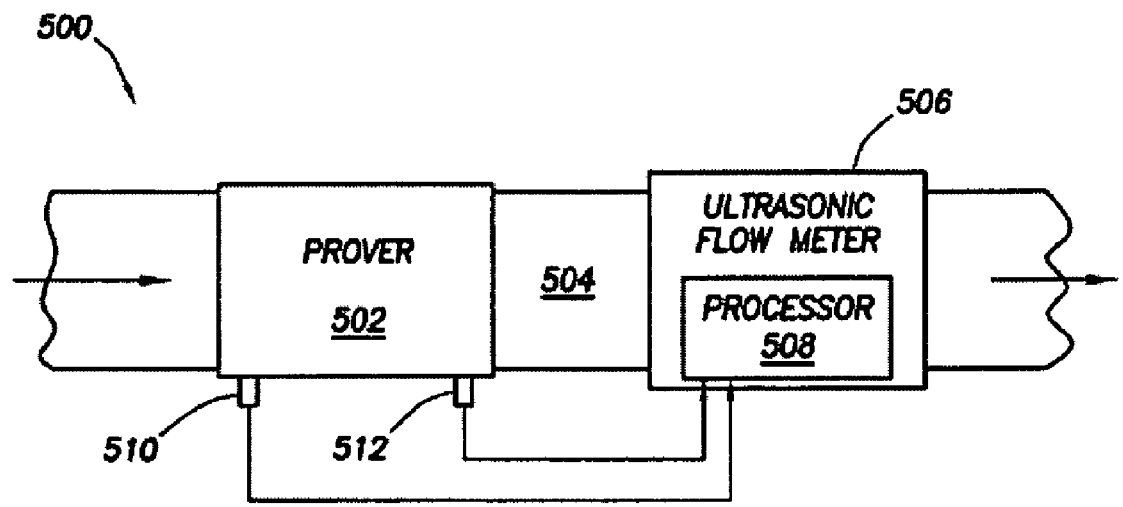
FIG. 5 illustrates a proving system in accordance with embodiments of the invention.

FIG. 5 illustrates a system 500 in accordance with some embodiments of the invention. In particular, FIG. 5 illustrates a prover 502 coupled within a fluid conduit 504. Likewise, coupled within the fluid conduit 504 is an ultrasonic flow meter 506. While the ultrasonic flow meter 506 of FIG. 5 is shown downstream of the prover 502, in alternative embodiments the flow meter may be equivalently upstream of the prover 502. The ultrasonic flow meter 506 comprises its own processor 508, which processor 508 is responsible for firing the ultrasonic transducers, receiving the ultrasonic signals, and calculating average flow rates within batch time periods. FIG. 5 also illustrates the prover upstream element detector 510 and the prover downstream element detector 512 electrically coupled to the processor 508 of the ultrasonic flow meter. Coupling the prover detector signals to the processor 508 enables the processor 508 to more closely correlate the prover time to the individual ultrasonic measurements that form an average flow rate over a batch time period. While FIG. 5 illustrates that each individual prover detector signal couples to the processor 508, in alternative embodiments the electrical signals generated by the prover element detectors may be combined in some fashion such that a single electrical signal couples to processor 508, with the asserted time of the single electrical signal indicative of the prover time. Because the processor 508 of the ultrasonic flow meter electrically couples to the prover, and because of the closer correlation between the prover time and the batch time periods, the processor 508 in accordance with embodiments calculates proof data that is of greater accuracy than in those situations where the ultrasonic flow meter manufactures a pulse output signal based on average flow rate over the batch time periods. In some embodiments, the ultrasonic meter 506 calculates and provides to external systems a volume during the prover time, and the ultrasonic meter may also provide a measured length of the prover time. Differences between the length of the actual prover time and measured length of the prover time may be attributable to latencies associated with processor time slicing and interrupts received by the processor, each of which affect how often a software program can read signals from the prover element switches. In other embodiments, the ultrasonic meter 506 calculates and provides to external systems an average flow rate over the prover time, and in these embodiments the ultrasonic meter may refrain from providing a measured prover time.

Figure 6:
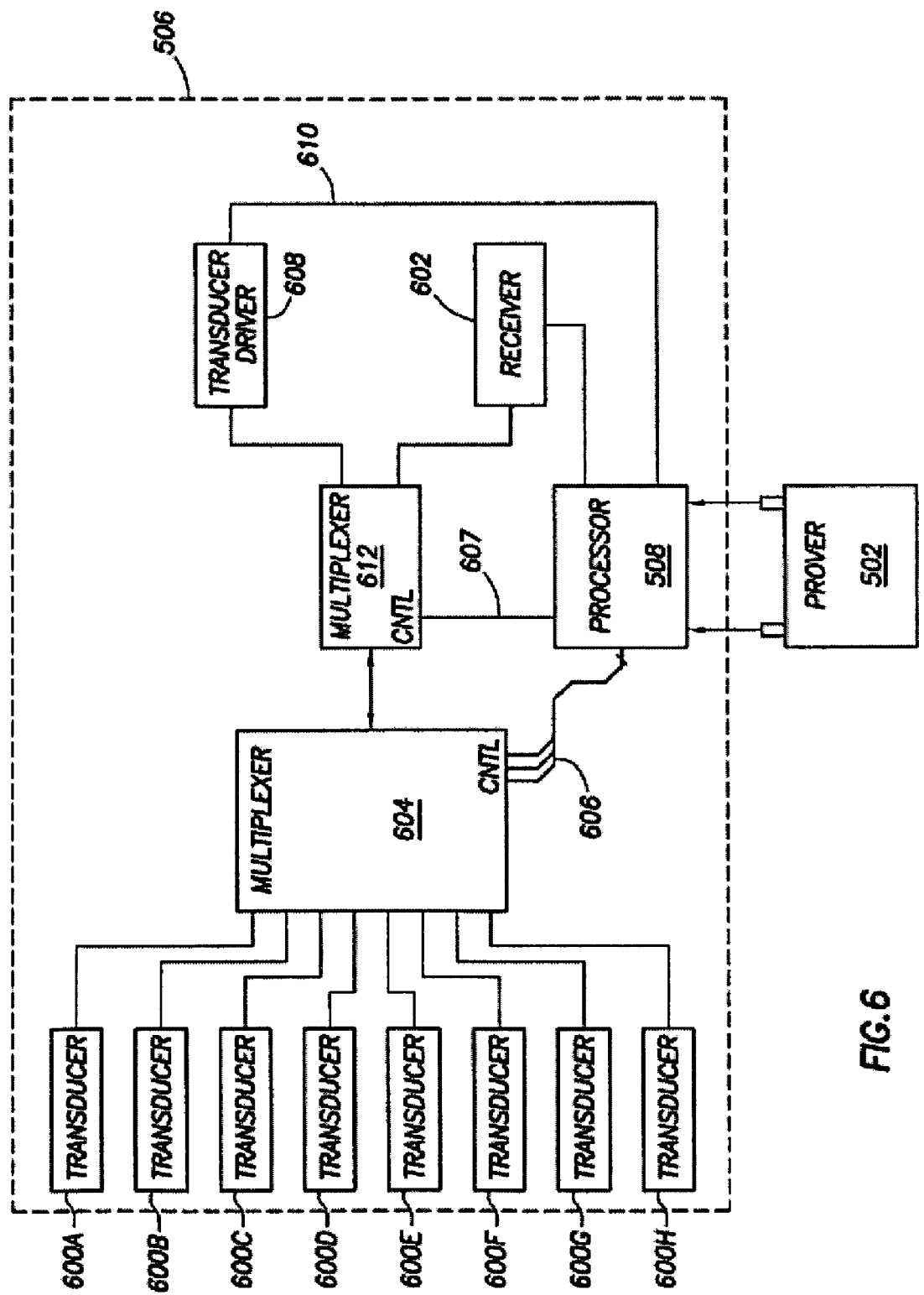
FIG. 6 illustrates, in block diagram form, an ultrasonic flow meter (and how the ultrasonic flow meter couples to a prover) in accordance with some embodiments of the invention.

FIG. 6 illustrates, in block diagram form, the electrical components of illustrative ultrasonic meter 506, and corresponding prover 502, in accordance with some embodiments. In particular, the ultrasonic meter 506 comprises a plurality of transducers 600A-600H. Although eight transducers are shown, greater or fewer transducers may be equivalently used. Each transducer 600 couples to the receiver circuit 602 through the 1 to N multiplexer 604 and the 1 to 2 multiplexer 612. The receiver circuit 602 receives electrical signals created by an ultrasonic signal impinging on the piezoelectric element of a transducer, amplifies and detects the signals. The processor 508 sends control signals across the control signal lines 606 and 607 to selectively couple each transducer 600 to the receiver circuit 602 when that transducer is acting to "catch" in the "pitch and catch" operation. The processor 508 may be a stand alone processor or a microcontroller. In other embodiments, the functionality of the processor may be implemented by way of a programmable logic device (PLD), field programmable gate array (FPGA), application specific integrated circuit (ASIC), or the like.

Still referring to FIG. 6, each transducer 600 shares transducer driver 608. The transducer driver 608 may take many forms. In some embodiments the transducer driver 608 comprises electrical circuitry to generate and amplify alternating current (AC) signals that are then applied to the respective transducer to induce vibration and therefore ultrasonic signals. In these embodiments, the transducer driver 608 operates at the command of the processor 508 sending control signals along the control signal line 610. In alternative embodiments, the transducer driver 608 amplifies AC signals provided to it by the processor 508 (and possibly other devices), the signals likewise provided over the control signal line 610. Each transducer 600 couples to the transducer driver through the 1 to N multiplexer 604 and the 1 to 2 multiplexer 612. Under control of programs executing on the processor 508, the processor 508 selectively couples each transducer 600 to the transducer driver 608 when that transducer is acting to "pitch" in the "pitch and catch" operation. FIG. 6 also illustrates prover 502 coupled to a processor 508. As discussed above, the processor 508 receiving both the upstream and downstream element detector signals is merely illustrative, and other forms of the signal to identify the prover time may be equivalently used.

Figure 7:
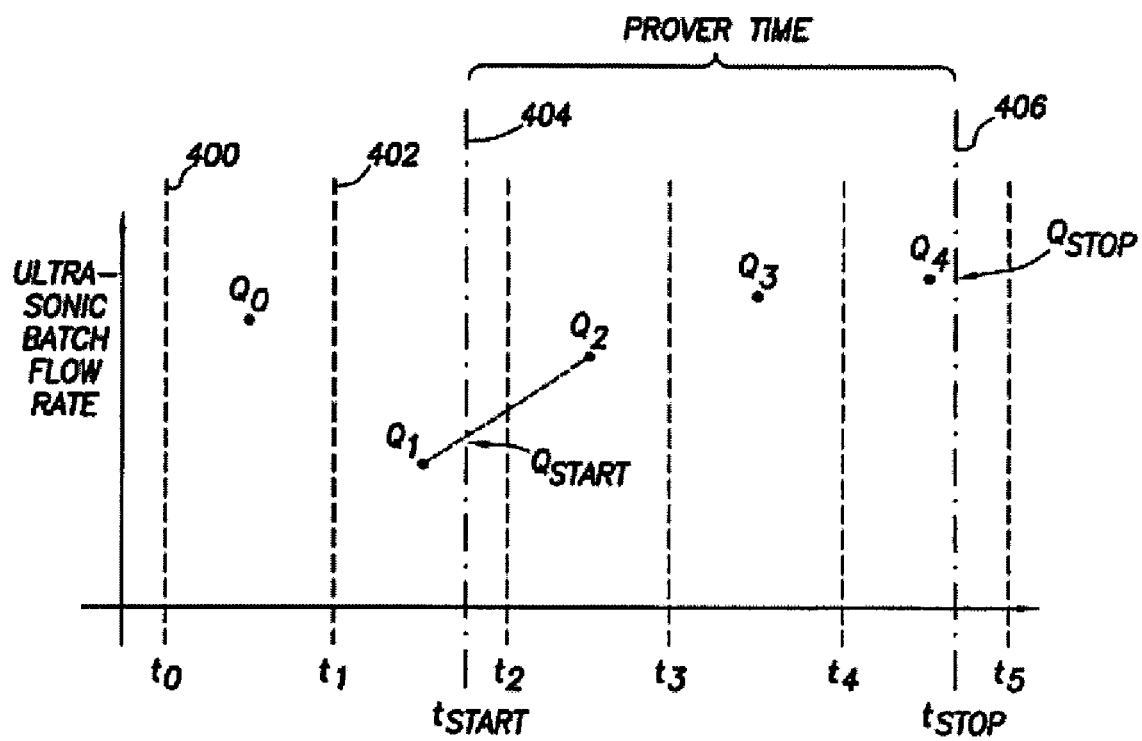
FIG. 7 illustrates an ultrasonically measured average flow rate as a function of time, including lines representing the batch time and the prover time.

Having discussed how the processor of the ultrasonic meter couples to the prover signals, attention now turns to calculating the meter measured volume and/or average flow rate in relation to the prover time in accordance with the embodiments of the invention. FIG. 7 shows: the ultrasonic batch flow rate as a function of time; dashed lines representing the batch time (e.g. lines 400 and 402); and dash-dot-dash lines representing the prover time (e.g., lines 404 and 406). As discussed above, the average flow rate $Q_0$, $Q_1$, $Q_2$, $Q_3$ and $Q_4$, while being calculated just after the end of a batch time period, may be thought of as the flow rate in the middle of the batch time period as illustrated. For those batch time periods falling completely within the prover time (e.g., times $t_2$ to $t_3$ and $t_3$ to $t_4$), the contribution to the total meter volume is the average flow rate within each batch time period multiplied by the amount of time of the batch time period. For batch time periods that only partially overlap the prover time (e.g. $t_1$ to $t_2$ and $t_4$ to $t_5$), in accordance with at least some embodiments the flow rate of fluid at the onset of the prover time ($Q_{start}$) and the flow rate of the fluid at the end of the prover time ($Q_{stop}$) are determined, and these values are used to calculate the contribution of the volume during partially overlapping batch time periods. With $Q_{start}$ and $Q_{stop}$ determined, calculating the meter volume during the prover time may thus take the form:

$$\text{Vol}_{meterproof} = (Q_1(t_2-t_1) - Q_{start}(t_{start}-t_1)) + Q_2(t_3-t_2) + Q_3(t_4-t_3) + Q_{stop}(t_{stop}-t_4) \quad (1)$$

where $\text{Vol}_{meterproof}$ is the meter measured volume during the prover time, $Q_x$ is the average flow rate within a batch time period, $t_x$ is a particular time, $t_{start}$ is the point in time when the prover time begins and $t_{stop}$ is the point in time when the prover time ends.

Determining $Q_{start}$ may take many forms. In some embodiments, $Q_{start}$ is determined as the linear interpolation between the average flow value $Q_1$ (assumed to be precisely in the middle of its batch time period) and the average flow rate $Q_2$ (also presumed to be precisely in the middle of its batch time period). In yet still further embodiments, an equation of a line that runs substantially through the various average flow rate values proximate in time or overlapping the prover time is determined, such as by any known or after developed curve fitting methodology Using the equation for the line that passes substantially through the average flow rate values, the value for $Q_{start}$ (using the time $t_{start}$) may be determined. Regardless of the method of which $Q_{start}$ is determined, it is seen that in these embodiments $Q_{start}$ is based in part on the average flow rate value $Q_1$. By definition, the average flow rate value $Q_1$ is made up of a plurality of individual ultrasonic measurements, some of which may fall outside the prover time.

With respect to $Q_{stop}$, in most situations the flow through both the prover and the ultrasonic meter to be proved has stabilized near the end of the prover time, and while interpolation similar to that for $Q_{start}$ may be used to determine $Q_{stop}$, in most cases it is sufficient to assign $Q_{stop}$ to be the same as the average flow rate for the last batch time period which partially overlaps with the prover time. Other interpolation methods for determining $Q_{start}$ and $Q_{stop}$ may be equivalently used.

Figure 8:
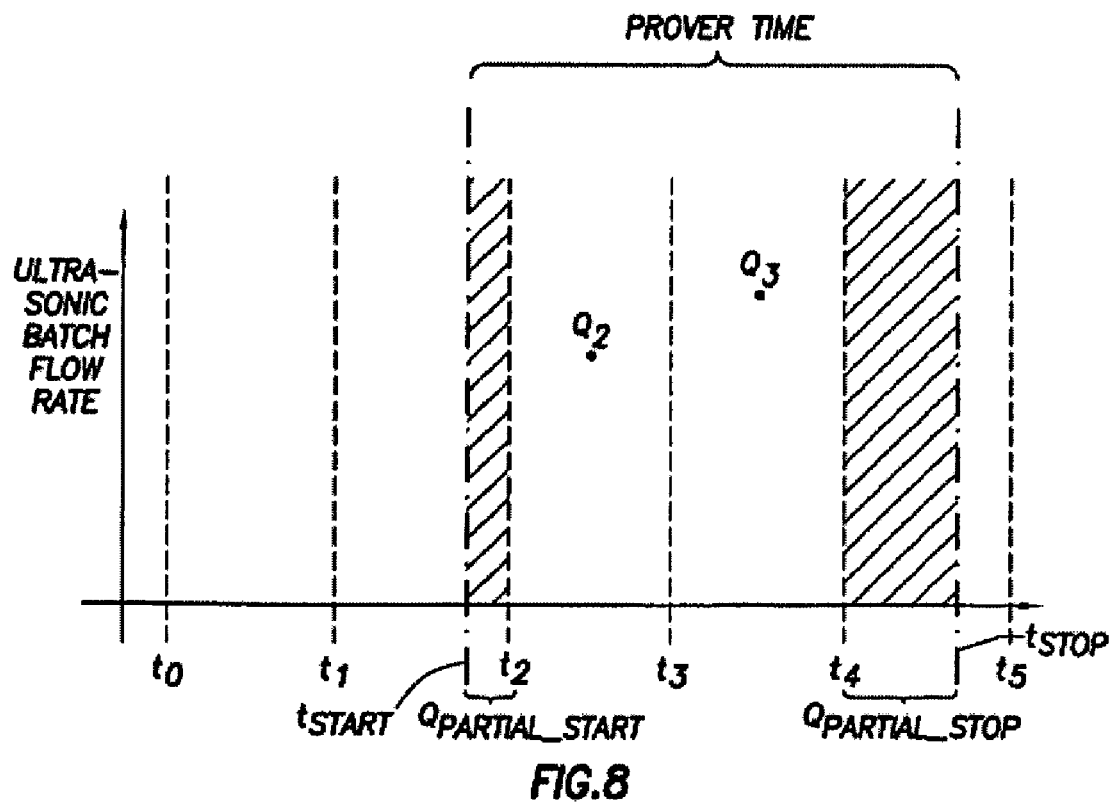
FIG. 8 graphically illustrates operations of alternative embodiments.

The embodiments discussed to this point involve determining $Q_{start}$ and $Q_{stop}$ values based at least in part on average flow rates, which themselves may be based on individual ultrasonic measurements outside the prover time. In accordance with alternative embodiments, the individual ultrasonic measurements that fall outside the prover time are excluded from the meter volume determination. FIG. 8 shows: the ultrasonic batch flow rates as a function of time; dashed lines representing the batch time periods; the prover time; and how these elements relate to alternative embodiments. During each batch time period a plurality of ultrasonic measurements are taken by the flow meter, and each batch flow rate ($Q_1$, $Q_2$, $Q_3$, etc.) is based on the plurality of ultrasonic measurements taken during the corresponding batch time period. For batch time periods falling wholly within the prover time (e.g., the batch time periods associated with average flow rate $Q_2$ and average flow rate $Q_3$) all or substantially all the individual ultrasonic measurements taken within their respective batch time periods are used to calculate their respective average flow rate. However, for the batch time periods overlapping the beginning and the end of the prover time, only a portion of the individual ultrasonic measurements are used to calculate an average flow rate.

Considering first the batch time period proximate to the beginning of the prover time, and which batch time period partially overlaps with the prover time. In accordance with the alternative embodiments the processor 508 is configured to identify the overlapping period of time between batch time and the prover time (e.g., using signals from the element detectors of the prover). Further, the processor is configured to calculate an average flow rate using only the individual ultrasonic measurements during the prover time, and to exclude individual ultrasonic measurements that fall outside the overlapping period. Likewise with respect to the batch time period that is proximate to and only partially overlaps the end of the prover time, the processor 508 is configured to use only individual ultrasonic measurements that correspond to the prover time, and to exclude individual ultrasonic measurements outside the overlapping period. In these embodiments, determining the meter measured volume corresponding to the prover time is calculated substantially according to the following equation:

$$\text{Vol}_{meterproof} = Q_{partial\_start}(t_2-t_{start}) + Q_2(t_3-t_2) + Q_3(t_4-t_3) + Q_{partial\_stop}(t_{stop}-t_4) \quad (2)$$

where $Q_{partial\_start}$ is the average flow rate for that portion of the batch time period that overlaps the prover time and which is calculated using the ultrasonic measurements during the prover time that overlap, and $Q_{partial\_stop}$ is the average flow rate for that portion of the batch time period that overlaps the prover time and is calculated using the ultrasonic measurements during the prover time that overlap.

Figure 9:
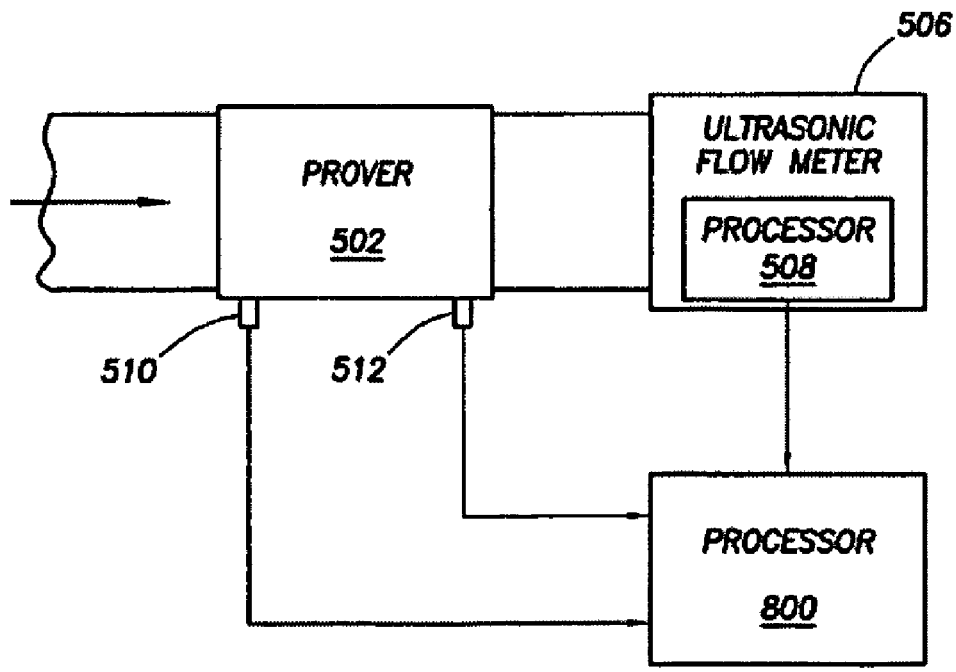
FIG. 9 illustrates alternative embodiments.

FIG. 9 illustrates a system in accordance with alternative embodiments. In particular, in FIG. 9, rather than processor 508 being directly coupled to the signals from the prover element detectors, an external processor 800 couples to the element detectors 510 and 512 respectively. The processor 800 also couples to the processor 508 of the ultrasonic meter. In these embodiments, the processor 508 is configured to provide to the processor 800 the individual ultrasonic measurements (possibly with each ultrasonic measurement time stamped) or the average flow rates calculated during each batch time period. In these embodiments, the external processor 800 is configured to determine which average flow rates and/or individual ultrasonic measurements fall within the prover time, and to calculate a meter volume for purposes of proving in accordance with the description above.

Figure 10:
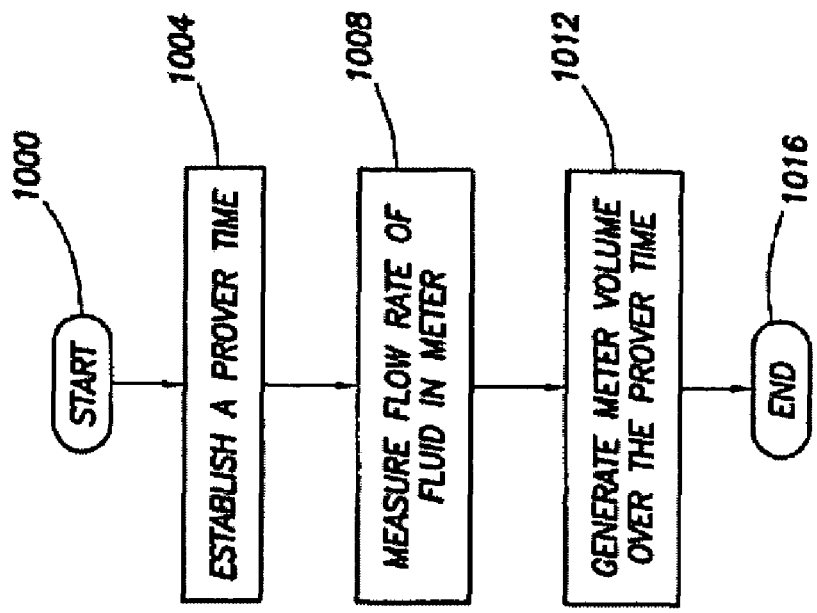
FIG. 10 illustrates a method in accordance with embodiments of the invention.

FIG. 10 illustrates a method in accordance with embodiments of the invention. In particular, the method starts (block 1000), and moves to establishing a prover time (block 1004). The prover time may be established, for example, as the time for a prover element to move between the upstream element detector 510 and the downstream element detector 512 of the prover 502 (of FIGS. 5 and 9). During the prover time, measurements of flow rate within the ultrasonic meter are taken (block 1008). As discussed above, these measurements may be a plurality of individual ultrasonic measurements taken during one or more batch tune periods. Next, a meter measured volume value is generated over the prover time (block 1012), and the process ends (block 1016). Generating the meter measured volume over the prover time (again block 1012) may take many forms, but each of the forms in accordance with the various embodiments has the characteristic that generating the meter measured volume does not involve generating a pulse output signal by the ultrasonic flow meter, and further does not involve determining the meter measured volume based on an attribute of the pulses of a contrived pulse output signal. In particular, in some embodiments individual ultrasonic measurements that fall outside the prover time are excluded when generating the ultrasonic meter volume over the prover time. In yet still other embodiments, the ultrasonic meter generates one or more average flow rate values, each average flow rate value corresponding to a batch time period. The average flow rate values are used to interpolate flow rates at the beginning of the prover time, and possibly the end of the prover time. Thus, in these embodiments individual ultrasonic measurements that fall outside the prover time are used in determining a volume of the meter during the prover time by virtue of the fact that the individual ultrasonic measurements combine to form the average flow rate values used in interpolations. In some embodiments, the interpolations may be linear interpolations between average flow rates of two batch periods. In alternative embodiments, three or more average flow rates may be curve-fitted to determine an equation of a line that passes substantially through each of the flow rate values, and from the equation a partial flow rate value may be determined for batch time periods that do not fully correspond to the prover time.

The various embodiments discussed to this point use a prover element traveling in the fluid stream triggering start and stop sensors to define the prover time. However, other meter proving systems may likewise benefit from his disclosure. Consider, for example, the master meter proving system 1100 illustrated in FIG. 11. In particular, the master meter proving system 1100 comprises a master meter 1102. The master meter 1102 may be any suitable meter (e.g. a turbine meter, ultrasonic meter) whose metering accuracy is known. The master meter 1102 provides flow rate measurements to a flow computer/prover 1104. The flow computer 1104 also couples to a meter to be proved, in these illustrative embodiments ultrasonic meter 1106. Unlike previous embodiments where a prover element traveling in the fluid stream past sensors defines the prover time, the flow computer 1104 internally generates signals indicative of the prover start and stop time. During the prover time or just after the end of the prover time, the flow computer 1104 gathers data from master meter 1102. In embodiments where the master meter 1102 is a turbine meter, the flow computer 1104 gathers electrical pulses indicative of fluid flow through the master meter 1102. In embodiments where the master meter 1102 is an ultrasonic meter, the flow computer 1104 may provide start and stop signals to the master meter 1102, and the master meter may calculate average flow rate over the prover time (or volume and measured time) in a manner similar to the embodiments discussed above.

Figure 11:
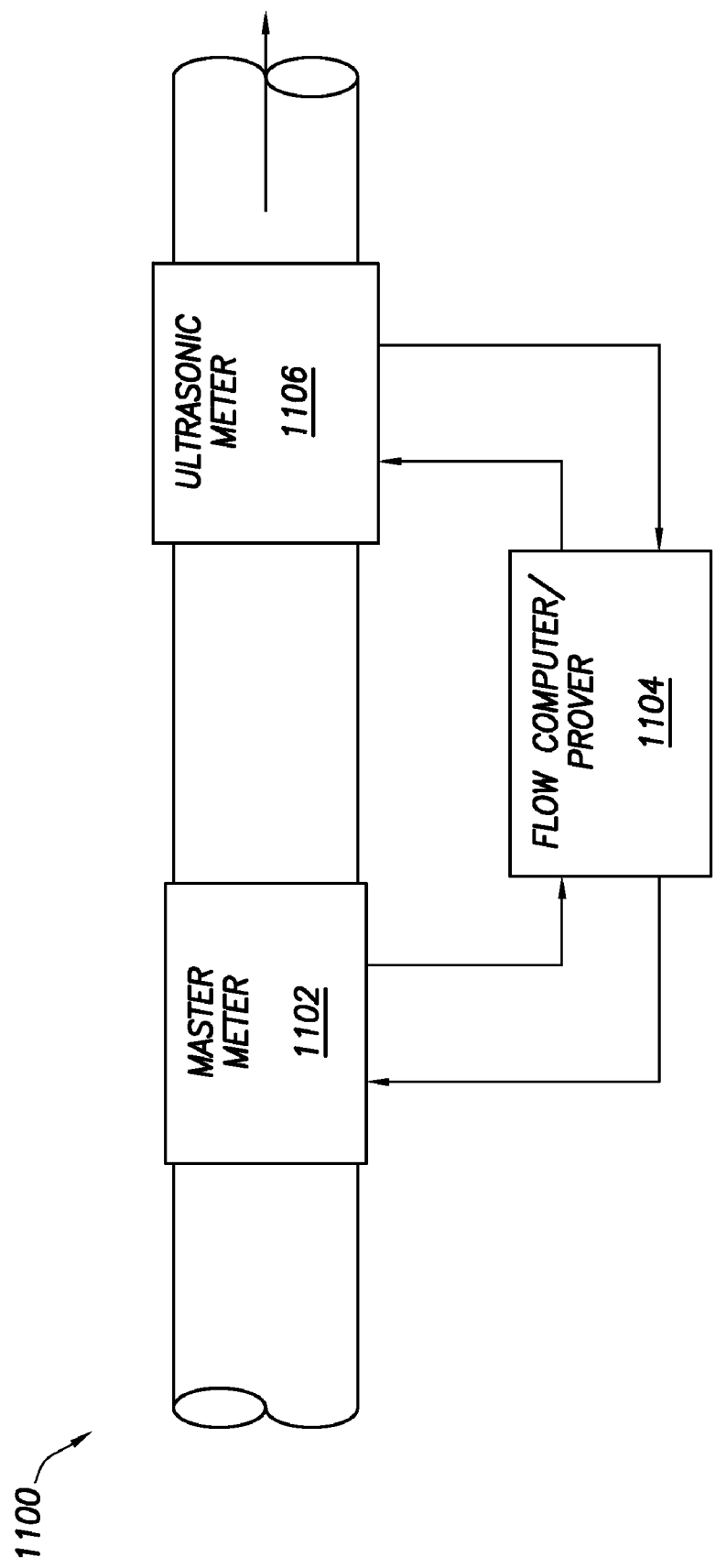
FIG. 11 illustrates a master meter proving system in accordance with embodiments of the invention.

Still referring to FIG. 11, the flow computer 1104 also couples to the ultrasonic meter 1106. During the prover time or just after the prover time, the flow computer 1104 gathers data from the ultrasonic meter 1106, and "proves" the ultrasonic meter 1106 by comparing fluid flow measured by the master meter 1102 to the fluid flow measured by ultrasonic meter 1106. The flow computer 1104 may provide start and stop signals to the ultrasonic meter 1106, and the ultrasonic meter 1106 may calculate average flow rate over the prover time (or volume and measured time) in a manner similar to the embodiments discussed above.

A gravimetric proving system is yet another example of a situation where the various embodiments discussed above may be used. In a gravimetric system, a fluid flows through a meter to be proved, and then to a reservoir associated with a weight measuring system. In gravimetric systems, the start time may be defined by the weight in the lower reservoir reaching a first predefined weight, and the stop time may be defined by the weight in the lower reservoir reaching a second predefined, higher weight. Start and stop signals may be provided to the meter to be proved, and the meter may calculate average flow rate over the prover time (or volume and perceived time) in a manner similar to the embodiments discussed above. Any proving system using a start signal and a stop signal may benefit from the above disclosure.

While various embodiments of this invention have been shown and described, modifications thereof can be made by one skilled in the art without departing from the spirit or teaching of this invention. The embodiments described herein are exemplary only and are not limiting. For example, while the various embodiments have been described in relation to an ultrasonic flow meter, any meter that operates in a mode where a plurality of measurements are made to calculate average flow over a batch period would benefit from the technique described. Further still, while the various embodiments have been described in relation to an ultrasonic meter that has a plurality of batch periods during the prover time, in accordance with alternative embodiments the prover time itself may define a batch period, such that the processor (either processor 508 of FIG. 5 or processor 800 of FIG. 9) uses the prover time as a batch period. In these embodiments, the plurality of ultrasonic measurements taken during the prover time would thus be transformed into an average flow rate over the prover time, and the meter volume determined by multiplying the average flow rate by the prover time. Accordingly, the scope of protection is not limited to the embodiments described herein, but is only limited by the claims which follow, the scope of which shall include all equivalents of the subject matter of the claims.

What is claimed is:

1. A system comprising:
   a prover device configured to establish a prover time;
   a flow meter comprising:
   a spoolpiece that fluidly couples within a fluid flow;
   a transducer pair mechanically coupled to the spoolpiece; and
   a processor electrically coupled to the transducer pair;
   wherein the processor of the flow meter electrically couples to the prover device;

wherein the processor of the flow meter calculates a volume of fluid that flows through the flow meter during the prover time.

2. The system of claim 1 wherein the processor is configured to take a plurality of individual flow rate values substantially contemporaneous with the prover time, and calculate an average flow rate over the prover time using only individual flow rate values that fall within the prover time.

3. The system of claim 1 wherein the processor is configured to: calculate a first average flow rate, the first average flow rate based on a plurality of flow rate values during a first batch time that corresponds only in part to the prover time; and calculate the volume of fluid flow through the flow meter using the first average flow rate.

4. The system of claim 3 further comprising:
wherein the processor is configured to, prior to when the processor calculates the volume of fluid flow, identify an overlapping period of time between the prover time and the first batch time period, and interpolate to determine a first interpolated flow rate based on the average flow rate and the overlapping period of time;
wherein the processor is configured to calculate the volume of fluid flow through the flow meter using the first interpolated flow rate.

5. The system of claim 3 further comprising:
wherein the processor is configured to, prior to when the processor calculates the volume of fluid flow through the flow meter, identify an overlapping period of time between the prover time and the first batch time period, obtain an equation for a line that runs substantially through a value of the first average batch flow rate and values for subsequent average batch flow rates which in whole or in part correspond to the prover time, and use the equation to determine an average flow rate during the overlapping period of time; and
wherein the processor is configured to calculate the volume of fluid flow through the flow meter using the average flow rate for the overlapping period of time.

6. The system of claim 1 further comprising
wherein the processor is configured to determine a plurality of individual flow rate values during a first batch time period that corresponds only in part to the prover time, and identify an overlapping period of time between the prover time and first batch time period; and
wherein the processor is configured to exclude the individual flow rate values that fall outside the overlapping period of time when calculating the volume of fluid flow through the ultrasonic meter.

7. The system as defined in claim 1 wherein the prover device further comprises:
a fluid conduit that fluidly couples within the fluid flow;
a first element detector coupled to the fluid conduit;
a second element detector coupled to the fluid conduit downstream of the first element detector; and
a prover element that travels with the fluid between first and second element detectors, the travel time between the first and second element detectors defining the prover time.

8. An ultrasonic flow meter comprising:
a spoolpiece configured to couple within a fluid pathway;
a plurality of ultrasonic transducers mechanically coupled to the spoolpiece and arranged such that the ultrasonic transducers impart ultrasonic energy to a fluid within the spoolpiece;
a processor electrically coupled to the plurality of ultrasonic transducers and configured to electrically couple to a prover and to receive signals from the prover indicative of a first period of time;
wherein the processor calculates a value indicative of the volume of fluid flow through the flow meter corresponding to the first period of time.

9. The system of claim 8 wherein the processor is configured to: calculate a first average flow rate, the first average flow rate based on a plurality of flow rate values during a second period of time that corresponds only in part to the first period of time; and calculate the value indicative of volume using the first average flow rate.

10. The system of claim 9 further comprising:
wherein the processor is configured to, prior to when the processor calculates the value indicative of volume, identify an overlapping period corresponding to the overlap in time between the first and second periods of time, and interpolate to determine a first interpolated flow rate based on the average flow rate and the overlapping period of time;
wherein the processor is configured to calculate the value indicative of volume using the first interpolated flow rate.

11. The system of claim 9 further comprising:
wherein the processor is configured to, prior to when the processor calculates the value indicative of volume, identify an overlapping period of time corresponding to the overlap in time between the first and second periods of time, obtain an equation for a line that runs substantially through a value of the first average flow rate and values for subsequent average flow rates which in whole or in part correspond to the first period of time, and use the equation to determine an average flow rate during the overlapping period of time; and
wherein the processor is configured to calculates the value indicative of volume using the average flow rate during the overlapping period of time.

12. The system of claim 8 further comprising
wherein the processor is configured to determine a plurality of individual flow rate values during a second period of time that corresponds only in part to the first period of time, and identify an overlapping period of time corresponding to the overlap in time between the first and second periods of time; and
wherein the processor is configured to excludes the individual flow rate values that fall outside the overlapping period of time when the processor calculates the value indicative of volume.

* * * * *

UNITED STATES PATENT AND TRADEMARK OFFICE
CERTIFICATE OF CORRECTION

PATENT NO. : 7,624,616 B2
APPLICATION NO. : 11/459077
DATED : December 1, 2009
INVENTOR(S) : Freund, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Twenty-sixth Day of October, 2010

David J. Kappos
*Director of the United States Patent and Trademark Office*